United States Patent
Riabov et al.

(10) Patent No.: US 11,237,933 B2
(45) Date of Patent: Feb. 1, 2022

(54) MULTI-AGENT PLAN RECOGNITION

(71) Applicant: International Business Machines Corporation, Armonk, NY (US)

(72) Inventors: Anton V. Riabov, Ann Arbor, MI (US); Shirin Sohrabi Araghi, Port Chester, NY (US); Octavian Udrea, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 819 days.

(21) Appl. No.: 15/842,449

(22) Filed: Dec. 14, 2017

(65) Prior Publication Data

US 2018/0217909 A1    Aug. 2, 2018

Related U.S. Application Data

(63) Continuation of application No. 15/418,452, filed on Jan. 27, 2017.

(51) Int. Cl.
*G06F 11/30* (2006.01)
*G06F 11/34* (2006.01)
(Continued)

(52) U.S. Cl.
CPC .......... *G06F 11/302* (2013.01); *G06F 9/4862* (2013.01); *G06F 11/3006* (2013.01);
(Continued)

(58) Field of Classification Search
USPC .......................................................... 706/62
See application file for complete search history.

(56) References Cited

U.S. PATENT DOCUMENTS

| 6,012,152 A | 1/2000 | Douik et al. |
| 7,006,992 B1 | 2/2006 | Packwood |

(Continued)

FOREIGN PATENT DOCUMENTS

| WO | 2012/142092 A1 | 10/2012 |
| WO | 2013/119648 A1 | 8/2013 |

OTHER PUBLICATIONS

Non-Final Office Action received for U.S. Appl. No. 15/842,281 dated Jul. 29, 2019, 53 pages.
(Continued)

*Primary Examiner* — Patricia I Young
(74) *Attorney, Agent, or Firm* — Amin, Turocy & Watson, LLP

(57) ABSTRACT

Techniques for solving a multi-agent plan recognition problem are provided. In one example, a computer-implemented method comprises transforming, by a device operatively coupled to a processor, a problem model and an at least partially ordered sequence of observations into an artificial intelligence planning problem through a transform algorithm. The problem model can comprises a domain description from a plurality of agents and a durative action. Furthermore, at least one of the observations of the at least partially ordered sequence of observations can be a condition that changes over time. The computer-implemented method further comprises determining, by the device, plan information using an artificial intelligence planner on the artificial intelligence planning problem. The computer-implemented method further comprises translating, by the device, the plan information into information indicative of a solution to the artificial intelligence planning problem.

20 Claims, 7 Drawing Sheets

(51) Int. Cl.
    *G06F 16/951*     (2019.01)
    *G06F 9/48*     (2006.01)
    *G06N 20/00*     (2019.01)
    *G06N 5/00*     (2006.01)
    *G06N 5/04*     (2006.01)

(52) U.S. Cl.
    CPC ........ *G06F 11/3438* (2013.01); *G06F 16/951* (2019.01); *G06N 5/043* (2013.01); *G06N 20/00* (2019.01)

(56) References Cited

U.S. PATENT DOCUMENTS

| | | | |
|---|---|---|---|
| 7,146,348 | B2 | 12/2006 | Geib et al. |
| 8,082,220 | B2 | 12/2011 | Hadad et al. |
| 8,250,355 | B2 | 8/2012 | Eilam et al. |
| 9,177,060 | B1 | 11/2015 | Bennett et al. |
| 9,330,119 | B2 | 5/2016 | Chan et al. |
| 2003/0050814 | A1 | 3/2003 | Stoneking et al. |
| 2003/0139902 | A1 | 7/2003 | Geib et al. |
| 2007/0129834 | A1 | 6/2007 | Howard et al. |
| 2007/0150427 | A1 | 6/2007 | Geib |
| 2007/0271263 | A1 | 11/2007 | Merrild |
| 2008/0243570 | A1 | 10/2008 | Moorkanat et al. |
| 2010/0169360 | A1 | 7/2010 | Cohen et al. |
| 2011/0225002 | A1 | 9/2011 | Fackler et al. |
| 2012/0265724 | A1 | 10/2012 | Michelin |
| 2012/0323627 | A1 | 12/2012 | Herring, Jr. et al. |
| 2013/0041712 | A1 | 2/2013 | Smoot et al. |
| 2013/0117060 | A1 | 5/2013 | Henriksen et al. |
| 2013/0144917 | A1 | 6/2013 | Hosurmath et al. |
| 2013/0185119 | A1 | 7/2013 | Palao et al. |
| 2014/0052494 | A1 | 2/2014 | Anne |
| 2014/0310285 | A1* | 10/2014 | Chan ................. G06F 11/0715 707/740 |
| 2015/0339580 | A1* | 11/2015 | Riabov .................. G06F 11/00 706/11 |
| 2015/0370766 | A1 | 12/2015 | Kossmann et al. |
| 2016/0321544 | A1 | 11/2016 | Hassanzadeh et al. |
| 2017/0056764 | A1 | 3/2017 | Shukla |
| 2017/0076194 | A1 | 3/2017 | Versace et al. |
| 2017/0213131 | A1 | 7/2017 | Hammond et al. |
| 2019/0114549 | A1 | 4/2019 | Ollsher |

OTHER PUBLICATIONS

Final Office Action received for U.S. Appl. No. 15/418,377 dated Oct. 18, 2019, 54 pages.
Final Office Action received for U.S. Appl. No. 15/842,281 dated Dec. 11, 2019, 38 pages.
Non-Final Office Action received for U.S. Appl. No. 15/418,452 dated Dec. 31, 2019, 53 pages.
Non-Final office Action received for U.S. Appl. No. 15/418,418, dated Apr. 4, 2018, 40 pages.
Non-Final office Action received for U.S. Appl. No. 15/842,252, dated Apr. 5, 2018, 33 pages.
Office Action dated Aug. 3, 2018 for U.S. Appl. No. 15/418,418, 40 pages.
Office Action dated Aug. 3, 2018 for U.S. Appl. No. 15/842,252, 45 pages.
Sohrabi, S., et al., "Scenario Planning for Enterprise Risk Management," 5 pages.
Sohrabi, S., et al., "Multi-Agent Plan Recognition with Noisy Observations and Temporal Actions," 5 pages.
Iranmanesh, H., et al., "An Intelligent System Framework for Generating Activity List of a Project Using WBS Mind map and Semantic Network," International Journal of Computer, Electrical, Automation, Control and Information Engineering, 2008, vol. 2, No. 4, pp. 1020-1027, World Academy of Science, Engineering and Technology.

Jilani, R., et al., "ASCoL: A Tool for Improving Automatic Planning Domain Model Acquisition," AIIA, Sep. 2015, pp. 438-451, Springer International Publishing Switzerland.
Behnke, G., "Integrating Ontologies and Planning for Cognitive Systems," Proceedings of the 28th International Workshop on Description Logics, 2015, 13 pages.
Sohrabi, S., et al., "State Projection via AI Planning," 2017, 7 pages, Association for the Advancement of Artificial Intelligence.
Sohrabi, S., et al., "Hypothesis Exploration for Malware Detection using Planning," Proceedings of the Twenty-Seventh AAAI Conference on Artificial Intelligence, 2013, pp. 883-889, Association for the Advancement of Artificial Intelligence.
Riabov, A., et al., "Planning-Based Reasoning for Automated Large-Scale Data Analysis," Proceedings of the Twenty-Fifth International Conference on Automated Planning and Scheduling, 2015, pp. 282-290, Association for the Advancement of Artificial Intelligence.
Riabov, A., et al., "New Algorithms for the Top-K Planning Problem,", ICAPS 2014, pp. 10-18.
Sohrabi, S., et al., "Finding Diverse High-Quality Plans for Hypothesis Generation," 22nd European Conference on Artificial Intelligence, 2016, 2 pages.
"Riabov, A., et al., ""Efficient High Quality Plan Exploration for Network Security,"" Proceedings of the Scheduling and Planning Applications woRKshop (SPARK), 2016, 6 pages."
Sohrabi, S., et al., "Plan Recognition as Planning Revisited," Proceedings of the 25th International Joint Conference on Artificial Intelligence (IJCAI), 2016, 7 pages.
Wilkins, D., "Can AI planners solve practical Problems?" Computational Intelligence Journal, 1990, 32 pages.
Tate, A., et al., "O-plan2: an open architecture for command, planning and Control," Intelligent Scheduling, 1994, 26 pages.
Vaquero, T., et al., "ItSIMPLE 2.0: An Integrated Tool for Designing Planning Domains," AIPS, 2007, 8 pages.
Simpson, R.M., et al., "Planning domain definition using GIPO," The Knowledge Engineering Review, 2007, vol. 22, No. 2, pp. 117-134, Cambridge University Press.
Yang, Q., et al., "Learning action models from plan examples using weighted MAX-SAT," Artificial Intelligence, 2006, pp. 107-143.
Yoon, S., et al., "Towards Model-lite Planning: A Proposal for Learning & Planning with Incomplete Domain Models," Workshop on AI Planning and Learning, 2007, 18 pages.
Zhuo, H., et al., "Refining Incomplete Planning Domain Models Through Plan Traces," Proceedings of the Twenty-Third International Joint Conference on Artificial Intelligence (IJCAI), 2013, 7 pages.
Sohrabi, S., et al., "Diagnosis as Planning Revisited," Proceedings of the Twelfth International Conference on the Principles of Knowledge Representation and Reasoning, 2010, pp. 26-36.
Sohrabi, S., et al., "Preferred Explanations: Theory and Generation via Planning," Proceedings of the Twenty-Fifth AAAI Conference on Artificial Intelligence, 2011, pp. 261-267.
Haslum, P., et al., "Diagnosis as Planning: Two Case Studies," International Scheduling and Planning Applications woRKshop (SPARK), 2011, 8 pages.
Ramírez, M., et al., "Plan Recognition as Planning," Proceedings of the 21st International Joint Conference on Artificial Intelligence (IJCAI), 2009, 6 pages.
U.S. Appl. No. 14/962,714, filed Dec. 8, 2015, and entitled, "Plan Recognition With Unreliable Observations," 88 pages.
Schoemaker, P., "Scenario Planning: A Tool for Strategic Thinking," Sloan Management Review, 1995, vol. 36, No. 2, pp. 25-40.
"Risk management—Principles and guidelines on Implementation," ISO/DIS 3100, 2009, International Organization for Standardization, 28 pages.
Shvo, M., et al., "An AI Planning-Based Approach to the Multi-Agent Plan Recognition Problem (Preliminary Report)," 2017, 9 pages.
"Multi-Criteria Approach to Planning and Scheduling through Criticism and Repair," ip.comTechnical Disclosure, Dec. 19, 2013, 7 pages.
"IBM Quality Program," ip.com Technical Disclosure, Apr. 11, 2007, 3 pages.

(56) References Cited

OTHER PUBLICATIONS

Kaminka, G., et al., "Monitoring Teams by Overhearing: A Multi-Agent Plan-Recognition Approach," Journal of Artificial Intelligence Research, 2002, vol. 17, pp. 83-135.
Banerjee, B., et al., "Multi-Agent Plan Recognition: Formalization and Algorithms," Proceedings of the Twenty-Fourth AAAI Conference on Artificial Intelligence, 2010, pp. 1059-1064.
"Mind Map," Wikipedia, https://en.wikipedia.org/wiki/Mind_map, Last accessed Jan. 24, 2017, 5 pages.
Non-Final Office Action received for U.S. Appl. No. 14/962,714 dated Aug. 8, 2018, 44 pages.
Final Office Action received for U.S. Appl. No. 14/962,714 dated Mar. 4, 2019, 17 pages.
Chen et al., "A planning approach to the recognition of multiple Goals", International Journal of Intelligent Systems vol. 28, No. 3, 2013, pp. 203-216.
Brenner et al., "Continual Planning and Acting in dynamic Multiagent Environments", Autonomous Agents and Multi-Agent Systems, vol. 19, No. 3, 2009, 12 pages.
Fraser et al., "Plan Execution in Dynamic Environments." In International Conference on Industrial, Engineering and Other Applications of Applied Intelligent Systems, Springer, Berlin, Heidelberg, 2005, 10 pages.
Boutilier et al., "Planning Under Uncertainty: Structural Assumptions and Computational Leverage", Proceedings of the Second European Workshop on Planning, 1995, 16 pages.
Sampath et al., "Diagnosability of Discrete-Event Systems", IEEE Transactions on Automatic Control, vol. 40, No. 9, Sep. 1995, pp. 1555-1575.
Cordier et al., "Event-Based Diagnosis for Evolutive Systems", Fifth International Workshop on Principles of Diagnosis, Oct. 17-19, 1994, 24 pages.
Thorsley et al., "Diagnosability of Stochastic Discrete-Event Systems Under Unreliable Observations", American Control Conference, Jun. 11-13, 2008, pp. 1158-1165.
Grastien et al., "Exhaustive Diagnosis of Discrete Event Systems through Exploration of the Hypothesis Space", Twenty Second International Workshop on Principles of Diagnosis, Oct. 4-7, 2011, 8 pages.
Grastien et al., "Diagnosis of Discrete-Event Systems Using Satisfiability Algorithms", Proceedings of the National Conference on Artificial Intelligence, vol. 22, No. 1, Jul. 22-26, 2007, 6 pages.
McIlraith, Sheila A., "Towards a Theory of Diagnosis, Testing and Repair", Proceedings of the Fifth International Workshop on Principles of Diagnosis, Oct. 17-19, 1994, 8 pages.
Ramirez et al., "Probabilistic Plan Recognition Using Off-the-Shelf Classical Planners", Proceedings of the Twenty-Fourth AAAI Conference on Artificial Intelligence, Jul. 11-15, 2010, 6 pages.
Pommerening et al., "Optimal Planning for Delete-Free Tasks with Incremental LM-Cut", Proceedings of the Twenty-Second International Conference on Automated Planning and Scheduling, Jun. 25-29, 2012, pp. 363-367.
Nguyen et al.",Generating diverse plans to handle unknown and partially known user Preferences", Artificial Intelligence, Jun. 18, 2012, pp. 1-31.
Srivastava et al., "Domain Independent Approaches for Finding Diverse Plans", International Joint Conference on Artificial Intelligence, Jan. 2007, 7 pages.
Bryce, Daniel., "Landmark-Based Plan Distance Measures for Diverse Planning", Proceedings of the Twenty-Fourth International Conference on Automated Planning and Scheduling, Jun. 21-26, 2014, pp. 56-64.
Coman et al., "Generating Diverse Plans Using Quantitative and Qualitative Plan Distance Metrics", Proceedings of the Twenty-Fifth AAAI Conference on Artificial Intelligence, Aug. 7-11, 2011, pp. 946-951.
Eppstein, David., "Finding the k Shortest Paths", Department of Information and Computer Science, University of California, Irvine, Mar. 31, 1997, pp. 1-26.
Gerevini et al., "Planning through Stochastic Local Search and Temporal Action Graphs in LPG", Journal of Artificial Intelligence Research, vol. 20, Dec. 2003, pp. 239-290.
Roberts et al., "Evaluating Diversity in Classical Planning", Proceedings of the Twenty-Fourth International Conference on Planning and Scheduling, Jun. 21-26, 2014, pp. 253-261.
Aslam et al., "The Star Clustering Algorithm for Information Organization", Grouping Multidimensional Data, Springer-Verlag, 2006, pp. 1-24.
Xu et al., "Survey of Clustering Algorithms", IEEE Transactions on Neural Networks, vol. 16, No. 3, May 2005, pp. 345-678.
Filippone et al., "A Survey of Kernel and Spectral Methods for Clustering", Pattern Recognition, vol. 41, No. 1, May 29, 2007, 37 pages.
Non-Final Office Action received for U.S. Appl. No. 16/295,731 dated Apr. 4, 2019, 47 pages.
Non-Final Office Action received for U.S. Appl. No. 15/418,377 dated Apr. 3, 2019, 54 pages.
Non-Final Office Action received for U.S. Appl. No. 16/296,364 dated May 1, 2019, 29 pages.
Final Office Action received for U.S. Appl. No. 15/418,452 dated Feb. 14, 2020, 17 pages.
Non-Final Office Action received for U.S. Appl. No. 15/418,377 dated Apr. 3, 2020, 30 pages.
Non-Final Office Action received for U.S. Appl. No. 15/842,281 dated Apr. 15, 2020, 31 pages.
Non-Final Office Action received for U.S. Appl. No. 15/418,452 dated Jun. 2, 2020, 18 pages.
Brailean et al., Noise Reduction Filters for Dynamic Image Sequences: A Review, 1995, IEEE (Year: 1995).
List of IBM Patents or Applications Treated as Related.
Final Office Action received for U.S. Appl. No. 15/418,377 dated Jul. 9, 2020, 29 pages.
Final Office Action received for U.S. Appl. No. 15/842,281 dated Jul. 9, 2020, 29 pages.
List of IBM Patents and Applications Treated as Related.
Office Action received for U.S. Appl. No. 16/717,146 dated Feb. 10, 2021, 41 pages.
Notice of Allowance received for U.S. Appl. No. 15/418,377 dated Jan. 27, 2021, 29 pages.
"Damerow, F., & Eggert, J. (2014). Predictive risk maps. 17th International IEEE Conference on Intelligent TransportationSystems (ITSC). doi: 10.1109/itsc.2014.6957772 (Year: 2014)".
Notice of Allowance received for U.S. Appl. No. 15/842,281 dated Feb. 5, 2021, 29 pages.
Office Action received for U.S. Appl. No. 16/717,146 dated Oct. 2, 2020, 73 pages.
Yang et al. "Proceedings of the Fifteenth International Conference on Automated Planning and Scheduling," pp. 241-250. Monterey, CA, USA, Jun. 2005. AAAI Press. (Year: 2005).

* cited by examiner

MULTI-AGENT PLAN RECOGNITION

STATEMENT REGARDING FEDERALLY SPONSORED RESEARCH OR DEVELOPMENT

This invention was made with Government support under Contract No.: H98230-13-D-0054/0006 awarded by Department of Defense. The Government has certain rights in this invention.

BACKGROUND

The subject disclosure relates to multi-agent plan recognition, and more specifically, to artificial intelligence solutions to multi-agent plan recognition problems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate machine learning to provide incremental static program analysis.

According to an embodiment, a computer-implemented method is provided. The computer-implemented method can comprise transforming, by a device operatively coupled to a processor, a problem model and an at least partially ordered sequence of observations into an artificial intelligence planning problem through a transform algorithm. The problem model can comprise a domain description from a plurality of agents and a durative action. Furthermore, at least one of the observations of the at least partially ordered sequence of observations can be a condition that changes over time. The computer-implemented method can further comprise determining, by the device, plan information using an artificial intelligence planner on the artificial intelligence planning problem. The computer-implemented method further comprises translating, by the device, the plan information into information indicative of a solution to the artificial intelligence planning problem.

In some embodiments, elements described in connection with the computer-implemented can be embodied in different forms such as one or more program instructions stored on a computer readable storage medium, a computer program product, a system, or another form.

DETAILED DESCRIPTION

Figure 1:
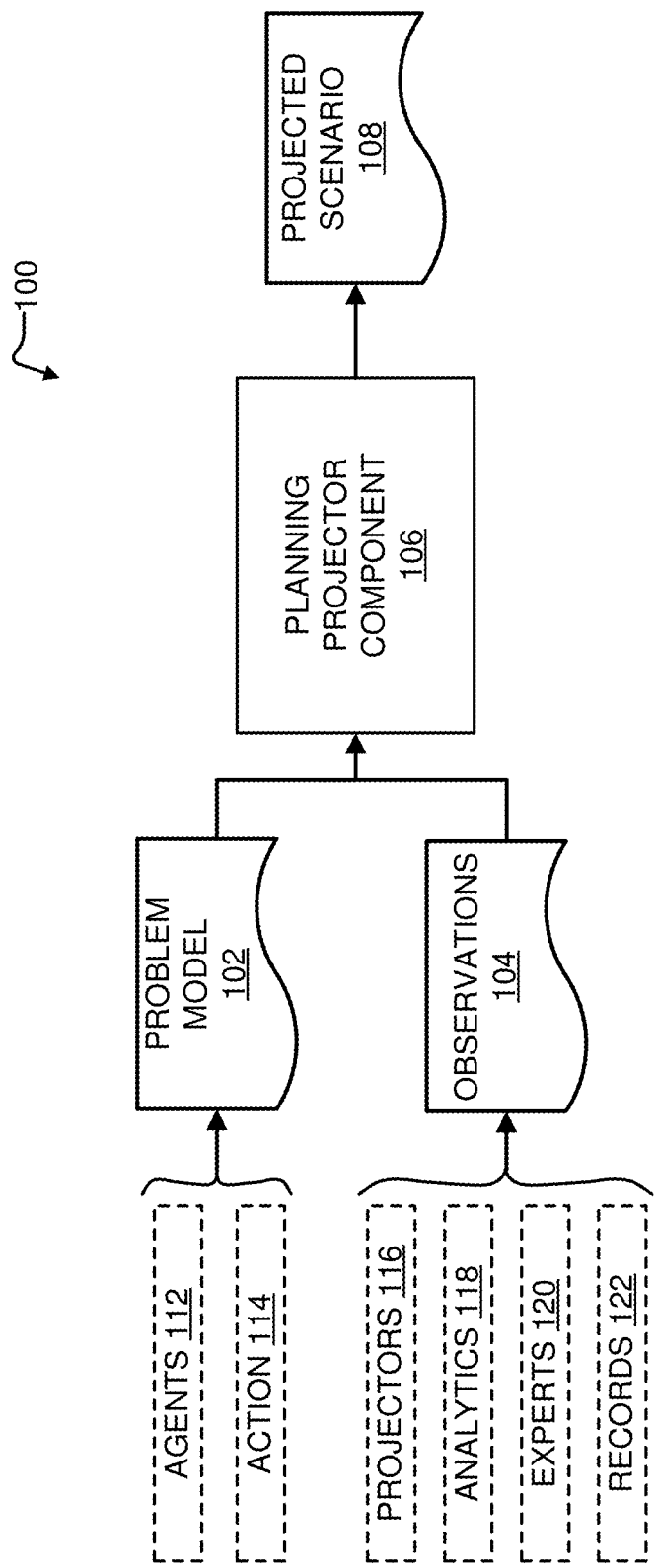
FIG. 1 illustrates a block diagram of an example, non-limiting system that can solve a multi-agent plan recognition problem in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

This disclosure relates in some embodiments to multi-agent plan recognition, and more specifically, to artificial intelligence solutions to multi-agent plan recognition problems.

Plan recognition in general includes the ability to recognize the plans and goals of agents from observations. Solutions to plan recognition problems can be useful in a myriad of applications including intelligent user interfaces, conversational agents, intrusion detection, video surveillance, and now increasingly in support of human-robot and robot-robot interactions. A basic plan recognition problem includes a single agent plan recognition problem. In a single agent plan recognition problem, a single agent or expert provides a set of observations from the world in anticipation of a stated goal. In contrast, a more complex plan recognition problem includes a multi-agent plan recognition problem. It is to be understood that, while the term "set" may be used with regard to one or more descriptions herein, in some embodiments, a set can include one object or element while in other embodiments, a set can include more than one object or element. In some embodiments, a set may be empty and include no objects or elements at any particular time or state. All such embodiments are envisaged.

In a multi-agent plan recognition problem, the goals and/or plans of multiple agents are hypothesized, based upon observations of the multiple agents. This provides a richer paradigm for addressing many of the applications noted above. Accordingly, one or more embodiments described herein provide rich and viable solutions to multi-agent plan recognition problems.

In contrast, one or more embodiments of this disclosure can provide an enriched characterization of multi-agent plan recognition that can provide support for a richer representation of the capabilities of multiple agents and the nature of observations. In particular, one or more embodiments of this disclosure can support: differing skills and capabilities of individual agents, agent skills and actions that are durative or temporal in nature (e.g., washing dishes or other durative processes); observations with respect to the state of the system, with such observations ranging over fluents rather than over actions as actions may not be directly observable but rather inferred via the changes they manifest; and/or observations that are unreliable, missing, or that cannot be accounted for by agents' goals and plans. For example, unreliable observations can include noisy observations, missing observations, and other forms of unreliable observations. Unreliable observations can be a result of a sensor malfunction, intentional obfuscation by malware, or mistakes made in data input. Additionally, noisy observations can be observations that cannot be explained by the actions of a plan for a particular goal. Missing observations can be observations that are undefined, void, or otherwise missing. In various embodiments, one or more of the agents, experts and/or other sources of information can be machine, specialized computers and/or databases including data generated for and/or to the same.

Accordingly, one or more embodiments of this disclosure can provide rich technical capabilities that reduce load on computational resources, and therefore reduce necessary bandwidth in providing suitable solutions to multi-agent plan recognition problems. In general, this disclosure describes computer-implemented methodologies, systems, apparatuses, and/or computer program products to implement the computational core of multi-agent plan recognition as an artificial intelligence planning task. Thus, further benefits of one or more embodiments of this disclosure can include the capability to solve a multi-agent plan recognition problem that lacks a library or that includes a defined library. This conception of multi-agent plan recognition as artificial intelligence planning can also facilitate the leveraging of state-of-the-art artificial intelligence planners, as well as advances in temporal planning in the generation of diverse plans.

To realize multi-agent plan recognition as artificial intelligence planning, one or more embodiments of this disclosure can implement a compilation process that takes multi-agent plan recognition problem model as input. The multi-agent aspect of the problem model can be compiled away. Subsequently, observations from the multiple agents can be compiled away such that an artificial intelligence planning problem is provided. The resulting artificial intelligence planning problem is temporal, has durative actions, and has temporal constraints. Thus, temporal or make span-sensitive artificial intelligence planners can be applied to generate a plan that is post-processed to yield a solution to the original multi-agent plan recognition problem. Embodiments of this disclosure can include at least three different approaches to final computation of the solution to the original multi-agent plan recognition problem. These approaches can include a delta approach, a diverse approach, and/or a hybrid approach to the computation.

Thus, one or more embodiments of this disclosure can: formulate a multi-agent plan recognition problem model with potentially unreliable observations over fluents, and actions that are temporal or durative in nature; characterize the multi-agent plan recognition problem as artificial intelligence planning via a compilation technique that facilitates the use of temporal artificial intelligence planning to generate hypothesized plans and goals and/or implement one or more approaches to computing a posterior probability of a goal given the observations, providing a measure of the quality of solutions.

As described above, plan recognition in general is the problem of inferring the goals and plans of an agent given a set of observations. In multi-agent plan recognition this task is extended to inferring the goals and plans of one or more agents. However, in many real-world applications of multi-agent plan recognition, observations are unreliable or missing. Furthermore, the observations can be of properties of the world at large rather than actions. Accordingly, the observations can not be explainable by an agents' goals and plans. Moreover, the actions of the agents can be durative or concurrent, further hindering tenable solutions.

According to one or more embodiments disclosed herein, multi-agent plan recognition including temporal actions and/or unreliable observations can be solved using a novel approach. To this end, a multi-step compilation technique is described in detail that facilitates the use of artificial intelligence planning for the computation of the posterior probabilities of the possible goals.

Turning now to the drawings, FIG. 1 illustrates a block diagram of an example, non-limiting system 100 that can solve a multi-agent plan recognition problem in accordance with one or more embodiments of the disclosed subject matter. The system 100 includes a planning projector component 106. The planning projector component 106 can receive input via an electronic input device and can output a solution to a multi-agent recognition problem via an electronic output device. Accordingly, the planning projector component 106 can perform one or more functions of the system 100.

As illustrated in FIG. 1, the planning projector component 106 can receive as input a problem model 102 and an at least partially ordered sequence of observations 104.

The problem model 102 can take many forms, including a multi-agent plan recognition problem model. Thus, the problem model 102 can include one or more domain descriptions such that the representative problem is well-defined. The at least partially ordered sequence of observation 104 includes observations that can also take many forms, including temporal actions, non-temporal actions, and other suitable observations.

The planning projector component 106 is an artificial intelligence planning component that is arranged to perform a computer-implemented method. Accordingly, the planning projector component 106 can include defined hardware configured to automate several program instructions described herein. The planning projector component 106 can also be implemented as a discrete set of program instructions that implement the described methodologies in any ordered sequence. As illustrated, the planning projector component 106 can receive the problem model 102 and the at least partially ordered sequence of observations 104 for processing.

Based on receipt of the problem model 102 and the at least partially ordered sequence of observations 104, the planning projector component 106 can compute at least one projected scenario 108. The computation of the planning projector component 106 can be facilitated using a transform algorithm, which is described more fully below. The planning projector component 106 can transform the problem model 102 and the at least partially ordered sequence of observations 104 and can output the at least one projected scenario 108.

The at least one projected scenario 108 can include a solution to the multi-agent plan recognition problem described in the problem model 102. For example, the at least one projected scenario 108 can include a posterior probability of goals of multiple agents given the at least partially ordered sequence of observations 104.

As further illustrated in FIG. 1, the problem model 102 includes domain descriptions from multiple agents 112 and a durative action 114. The domain descriptions can establish a well-defined world view for the problem model 102 and therefore provide a well-defined problem to which a solution is sought. The multiple agents 112 can include any particular number of individual agents. Accordingly, the multiple agents 112 can include between 1 and n agents, with n being larger than 1. According to at least one embodiment, the multiple agents 112 include many agents. According to another embodiment, the multiple agents 112 include more than two agents.

With regard to the durative action 114, and as used herein, the term "durative action" can refer to actions having a temporal component or an associated duration of time. As a non-limiting example, a durative action can include the action of performing a defined task such as walking from a first point to a second point on a defined geography. As a further non-limiting example, a durative action can include the action of performing a defined task such as depositing paint on an area of a wall or building. Other durative actions are contemplated, and the examples provided herein are not to be construed as limiting in any manner.

Additionally, the at least partially ordered sequence of observations 104 can include fluent conditions and/or other conditions that change over time. Fluent conditions are conditions that change over time, and can include a variety of conditions associated with the domain descriptions of the problem model 102. These fluent conditions can include, for example, degradation of an object, traffic within a loading dock, weather conditions over a defined geography, and other suitable conditions. The at least partially ordered sequence of observations 104 can also include other forms of conditions, including but not limited to, unreliable conditions. These unreliable conditions can include noisy conditions, inconsistent conditions, missing conditions, or other suitable conditions. Generally, as used herein, a noisy condition can be a condition that cannot be explained by the actions of a plan for a particular a goal. Other fluent conditions, conditions that change over time, and/or unreliable conditions are also contemplated, and the examples provided herein are not to be construed as limiting in any manner Thus, according to embodiments of this disclosure, all forms of observations and conditions, including unreliable observations, unreliable conditions, noisy observations, noisy conditions, missing observations, and missing conditions, can be applicable.

In various embodiments, the at least partially ordered sequence of observations 104 can be received from one or more projectors 116, analytics 118, experts 120, and/or records 122. The at least partially ordered sequence of observations 104 can also include an action condition or otherwise suitable condition.

The one or more projectors 116 can include artificial intelligence planning projectors associated with the multi-agent plan recognition problem. An artificial intelligence planning projector of the one or more projectors 116 can include a planning projector component 106, for example. An artificial intelligence planning projector of the one or more projectors 116 can also include any other suitable projector. Other planning projectors are also contemplated, and the examples provided herein are not to be construed as limiting in any manner.

The analytics 118 can include analytics sourced from the Internet or other suitable sources. The analytics 118 can therefore include defined analytics received from news sources, social media websites, news websites, and other Internet sources. The analytics 118 can also include analytics processed from multiple other defined sources not directly associated with the Internet. For example, the analytics 118 can include processed information gathered from multiple physical sources such as people and places. Other forms of analytics are also contemplated, and the examples provided herein are not to be construed as limiting in any manner.

The experts 120 can include people, users and/or specialized computers or devices that are considered experts in a particular area defined in the problem model 102 and/or the associated domain descriptions of the problem model 102. The experts 120 can include, for example, weather experts providing information related to weather over a defined geography. The experts 120 can also include, for example, an expert in the degradation of objects such as oil reserves. The experts can also include, for example, traffic experts providing information related to traffic over a defined geography or within a loading dock attached to a defined geography. Other experts are also contemplated, and the examples provided herein are not to be construed as limiting in any manner.

Additionally, the records 122 can include historical records and other associated data. The records 122 can therefore include any suitable information related to the above examples, including historical information related to weather over a defined geography, traffic conditions over a defined geography, boundaries of defined geographies, and other attributes. Other forms of historical information and records are also contemplated, and the examples provided herein are not to be construed as limiting in any manner.

As described briefly above, the planning projector component 106 can transform the problem model 102 and the at least partially ordered sequence of observations 104 using a transform algorithm. The planning projector component 106 can output the at least one projected scenario 108 as a solution to a multi-agent plan recognition problem described in the problem model 102.

Figure 2:
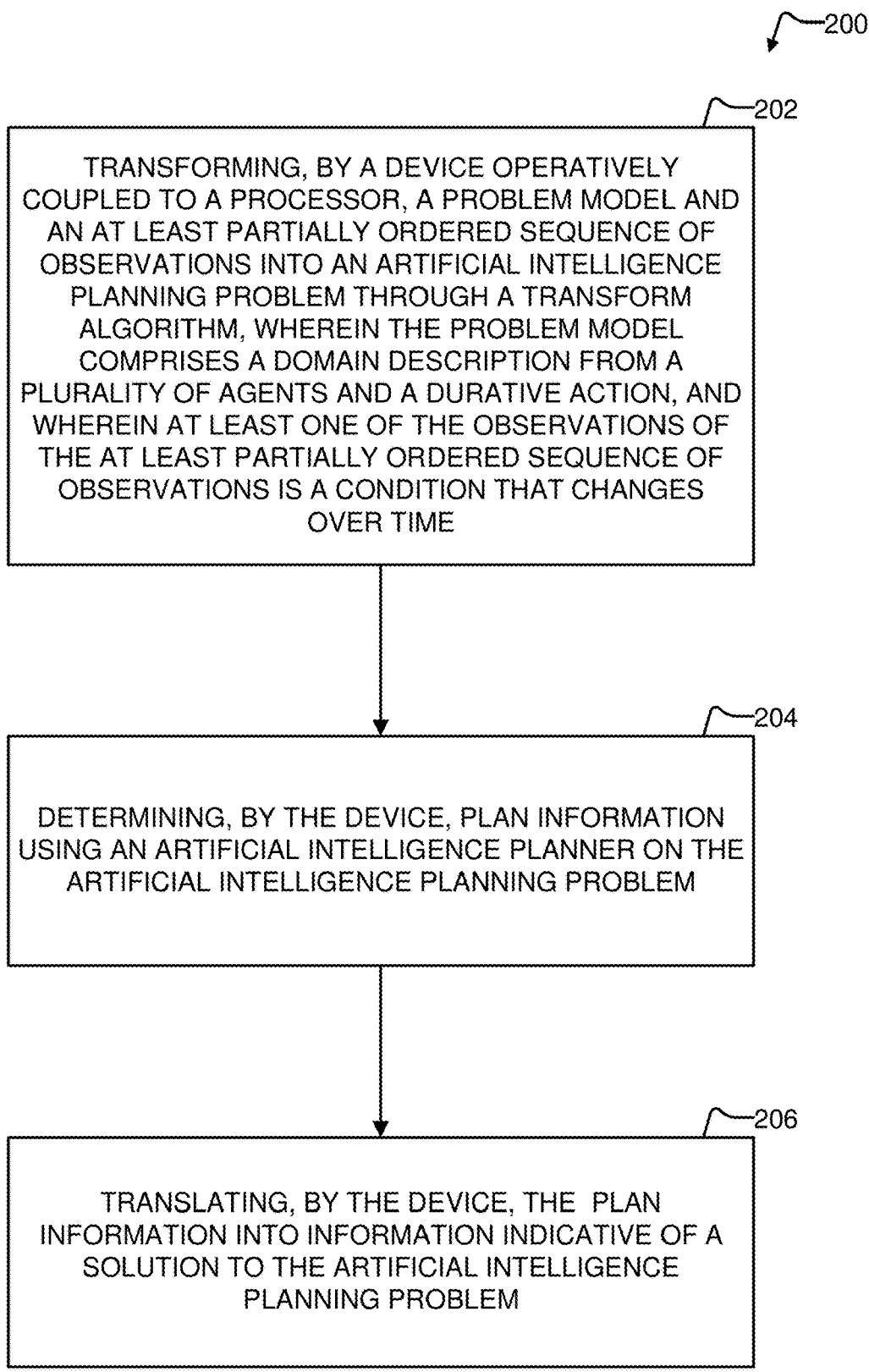
FIG. 2 illustrates a flowchart of an example, non-limiting computer-implemented method of solving a multi-agent plan recognition problem in accordance with one or more embodiments of the disclosed subject matter.

FIG. 2 illustrates a flowchart of an example, non-limiting computer-implemented method 200 of solving the multi-agent plan recognition problem in accordance with one or more embodiments of the disclosed subject matter. The computer implemented method 200 can include, for example, a sequence of program instructions to be performed by a planning projector component, such as the planning projector component 106. The computer implemented method 200 can include, but is not limited to, blocks 202, 204, and 206. Repetitive description of like elements employed in other embodiments described herein is omitted for sake of brevity.

The computer-implemented method 200 can include transforming, by a device operatively coupled to a processor, the problem model 102 and the at least partially ordered sequence of observations 104 into an artificial intelligence planning problem through a transform algorithm, at block 202 (e.g., by planning projector component 106). The transform algorithm is described more fully below.

As described above, the problem model 102 can comprise a domain description from multiple agents 112 and a durative action 114. Furthermore, at least one of the observations of the at least partially ordered sequence of observations 104 can be a condition that changes over time. In this regard, the at least one of the observations of the at least partially ordered sequence of observations 104 can be referred to as a "fluent" or a "fluent condition." As used herein, a "fluent" can be a relation or observation whose truth values vary from situation to situation. In some embodiments, the situation can be a real world event and can be observed, detected or sensed by a human agent, a specialized computer or device or the like.

Furthermore, and according to at least one embodiment, the partially ordered sequence of observations 104 used in the transformation includes an action condition. Generally, this action condition cannot be a fluent condition. Accordingly, this action condition cannot change over time. However, in this scenario, the computer-implemented method 200 can include translating the action condition into a second condition that changes over time. Thus, the translated action condition can be transformed and processed as described above with regard to fluent conditions.

According to another embodiment, the description of the problem model 102 can comprise an attribute selected from the group consisting of a finite or defined set of facts, an initial state, a finite or defined set of action operators, a goal condition, and a plurality of agents 112 associated with the problem model.

Generally, the finite set of facts can include any facts associated with the problem model 102. For example and without limitation, the finite set of facts can include a particular number of facts related to the multi-agent plan recognition problem, a particular number of facts associated with an attribute, or any other suitable facts. In some embodiments, the facts and/or attributes can be related to a system, the world The finite set of action operators can include operators for actions including the durative actions described above. The action operators for these actions can include any suitable action operators. Furthermore, the goal condition can include a desired goal condition given the at least partially ordered sequence of observations 104. The goal condition can include, for example, a goal condition for the problem model 102. However, according to at least one embodiment, a defined goal condition is not necessary. Accordingly, in this example, the description of the problem model 102 can lack a goal condition or can include a defined goal condition. Similarly, the description of the problem model 102 can also lack an initial state or include a defined initial state in some embodiments.

In response to block 202, the computer-implemented method 200 includes determining, by the device, plan information using an artificial intelligence planner on the artificial intelligence planning problem, at block 204 (e.g., by planning projector component 106). The plan information can include an artificial intelligence plan organized as a plan recognition problem. The plan information can therefore lack a defined number of agents 112 and is therefore simplified as compared to the multi-agent plan recognition problem. The plan information can also lack unreliable conditions through processing by the planning projector component 106. This can result in simplified computing and reduces required resources in computing a final solution. Reduction or simplification of the problem model 102, and transformation into the artificial intelligence planning problem, is described more fully below.

In response to the processing at block 203, the computer-implemented method 200 includes translating, by the electronic device, the plan information into information indicative of a solution to the artificial intelligence planning problem, at block 206 (e.g., by planning projector component 106). A solution to the artificial intelligence planning problem can include at least a posterior probability of goals given the at least partially ordered sequence of observations 104. A more detailed description of the computation of block 204 and the translation of block 206 is presented below with reference to FIG. 3.

Figure 3:
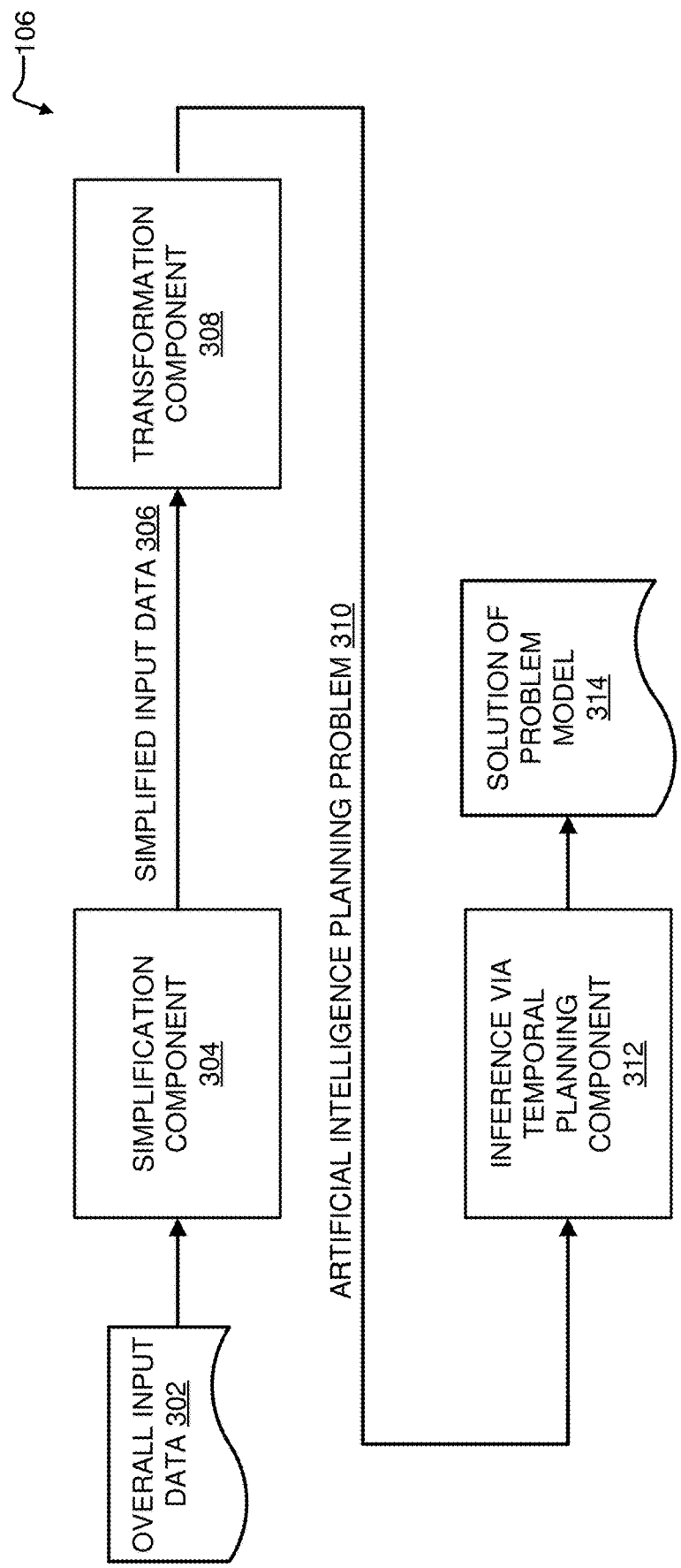
FIG. 3 illustrates a block diagram of an example, non-limiting planning projector component that can solve a multi-agent plan recognition problem in accordance with one or more embodiments of the disclosed subject matter.

FIG. 3 illustrates a block diagram of an example, non-limiting planning projector component 106 that can solve a multi-agent plan recognition problem in accordance with one or more embodiments of the disclosed subject matter. The planning projector component 106 can include a simplification component 304, a transformation component 308 electrically coupled to the simplification component 304, and an inference via temporal planning component 312 electrically coupled to the transformation component 308. Other arrangements of the individual illustrated components of the planning projector component 106 can also be applicable. Therefore, the particular arrangement illustrated is one non-limiting example. Repetitive description of like elements employed in other embodiments described herein is omitted for sake of brevity.

As shown in FIG. 3, the planning projector component 106 can include a simplification component 304 that can receive overall input data 302. The simplification component 304 can simplify the overall input data 302 into simplified input data 306.

Figure 4:
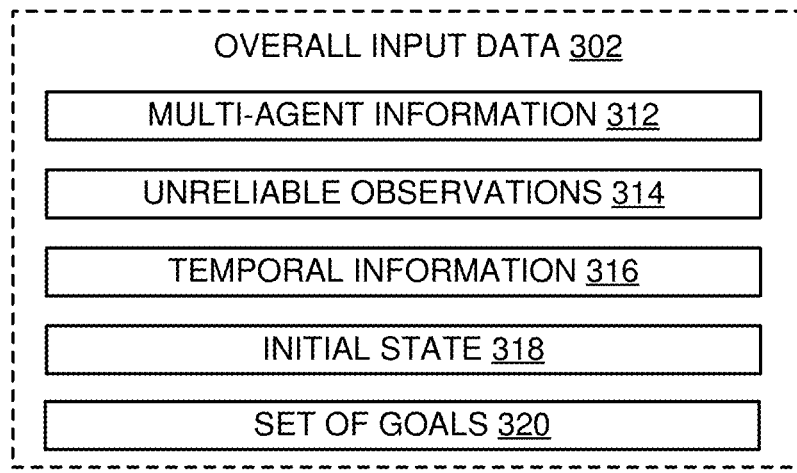
FIG. 4 illustrates a block diagram of a non-limiting example of overall input data in accordance with certain embodiments of the disclosed subject matter.

Generally, the overall input data 302 can include a plurality of information and data. For example, and as illustrated in FIG. 4, the overall input data 302 can include multi-agent information 312, unreliable observations 314, temporal information 316, initial state 318, and/or a set of goals 318. Repetitive description of like elements employed in other embodiments described herein is omitted for sake of brevity.

Figure 5:
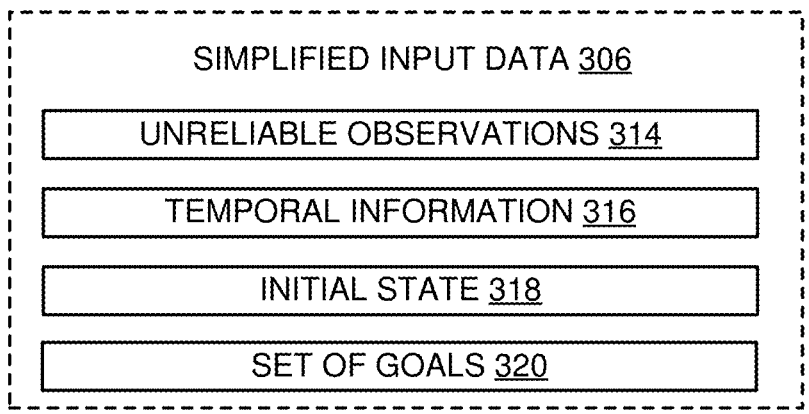
FIG. 5 illustrates a block diagram of a non-limiting example of simplified input data in accordance with certain embodiments of the disclosed subject matter.

Additionally, the simplified input data 306 can include a plurality of data that is simplified as compared to the overall input data 302. For example, and as illustrated in FIG. 5, the simplified input data 306 can include the unreliable observations 314, the temporal information 316, the initial state 318, and the set of goals 320. Repetitive description of like elements employed in other embodiments described herein is omitted for sake of brevity.

The simplification of data 302 into data 306 transforms an original multi-agent plan recognition problem having temporal actions and unreliable observations into a plan recognition problem. Accordingly, when processed by the planning projector component 106 and/or the simplification component 304, the simplification of data 302 into data 306 cannot be performed by a human (e.g., is greater than the capability of a single human mind). For example, an amount of data processed, a speed of processing of data and/or data types (e.g., electronic data types) processed by the planning projector component over a certain period of time can be greater, faster and different than an amount, speed and data type that can be processed by a single human mind over the same period of time. For example, a multi-agent plan recognition problem with temporal actions can be described as set forth below, in Definition 1:

> A Multi-agent Plan Recognition (MAPR) problem
> with temporal actions is defined as $P=(F, I, O,$
> $\Gamma, PROB, N, \{A_i\}_{i=1}^n)$          Definition 1

In Definition 1, F is a set of fluents and $I \subseteq F$ defines the initial state. Additionally, $O=[o_1, \ldots, o_m]$, where $o_i \in F$, $i \in [1,m]$ is the at least partially ordered sequence of observations 104. Furthermore, F is the set of possible goals G, $G \subseteq F$, PROB is the goal priors P (G), $N=\{1, \ldots, n\}$ is the number of agents, and $A_i$ is a set of temporal actions for agent i.

The solution to the multi-agent plan recognition problem with temporal actions is the probability of plans given observations, P ($\pi$|O), and the probability of goals given observations, (G|O). It is noted that the notion of concurrency amongst actions is now modeled via the temporal actions rather than through joint actions and the defined concurrency constraints over them. It is further noted that the use of joint actions indicates that no two actions from the same agent occur concurrently, but actions from different agents can occur concurrently. The use of temporal actions allows concurrency of the agent's actions as well as actions of different agents.

The observations over a set of actions can be encoded in the problem model 102 using special unique predicates. Such special predicates can be termed, for example, "happened_start_a" and "happened_end_a" that are added to each action either to the "add_s" list or the "add_e" list. This can effectively model occurrence of an action.

It is also noted that the goals being pursued by the agents need not necessarily be unrelated to one another. For example, an unrelated goal might be a combination of goals, (e.g., a conjunction, disjunction or a Subset). For example, an agent assisting two other agents who are pursuing goals $G_1$ and $G_2$, respectively, might have the goal $G_1 \cup G_1$ in its set of goals. Thus, $\Gamma$, the set of possible goals pursued by the agents, might contain complex goals rather than one common goal shared by all agents.

To transform this multi-agent plan recognition problem to a plan recognition problem with temporal actions, the temporal actions are unchanged and left as temporal. The transformation step creates a temporal planning domain, where the privacy of fluents and objects is respected. This adheres to a privacy model that restricts the number of objects and fluents that an agent has access to. That is, agent i should be able to execute action a if and only if action a is private to agent i or action a is public to all agents. This is done using the special predicates described above that keep track of an agent's access to fluents and objects.

In this example, every object o and agent i in the domain are assigned a corresponding fluent. For an agent i to be allowed to execute an action on object o, a precondition must be met, in which the corresponding fluent holds. Finally, the privacy model can be incorporated into the initial state. The above translation is both sound and complete, and a temporal planner or artificial intelligence planner as described herein can use the resulting encoding to produce solutions that do not violate the privacy model for the agents. This results in a plan recognition problem where the planning domain is temporal.

The plan recognition problem can be described as a tuple set forth below, in Equation 2:

$$P^r = (F, A, I, O, \Gamma, PROB) \qquad \text{Equation 2}$$

In Equation 2, (F, A, I) is the planning domain and $O = [o_l, \ldots, o_m]$, where $o_i \in F$ and $i \in [1,m]$ is the at least partially ordered sequence of observations 104. Additionally, $\Gamma$ is the set of possible goals, G, $G \subseteq F$ and PROB is the probability of a goal, P (G), or the goal priors.

Unreliable observations from Equation 1 and Equation 2 are defined as those observations that have not been added by the effect of any actions of a plan for a particular goal. Additionally, missing observations are those observations that have been added but were not observed (i.e., are not part of the observation sequence). To address the unreliable observations, the definition of satisfaction of an observation sequence can be modified by an action sequence to allow observations to be left unexplained. Given an execution trace and an action sequence, an observation sequence is said to be satisfied if there is a non-decreasing function that maps the observation indices into the state indices as either explained or discarded. Hence, observations are all considered, while some can be left unexplained.

The solution to the plan recognition problem, $P^r$, is the posterior probabilities of plans given observations, P ($\pi$|O), and the posterior probabilities of goals given observations, P (G|O). Artificial Intelligence planning is used to approximate these probabilities. For example, P ($\pi$|O) is approximated by considering three objectives over a set of sample plans: (i) the cost of the original actions, (ii) the number of missing observations, and (iii) the number of unexplainable observations. Posterior probabilities of goals given observations, P (G|O), can then then computed by a summation over P ($\pi$|O) for all plans that achieve G and satisfy O. Posterior probabilities of goals given observations, P (G|O), can also be computed by considering the cost difference of plans, or $\Delta$, that achieve G and O and achieve G and not O.

Turning back to FIG. 3, the planning projector component 106 further includes a transformation component 308 that can receive the simplified input data 306. The transformation component 308 can transform the simplified input data 306 into an artificial intelligence planning problem 310. The transformation can be accomplished by compiling away observations from the simplified input data 306. Accordingly, when compiling by the planning projector component 106 and/or the transformation component 308, the transformation of simplified input data 306 into the artificial intelligence planning problem 310 cannot be performed by a human (e.g., is greater than the capability of a single human mind). For example, an amount of data processed, a speed of processing of data and/or data types processed by the planning projector component 106 over a certain period of time can be greater, faster and different than an amount, speed and data type that can be processed by a single human mind over the same period of time.

There are several manners in which to compile away the observations depending on the nature of the given observations. According to this example, the transformation component 308 compiles away observations using the special predicates described above for each fluent in the observation sequence O and ensuring that their order is preserved. To address unreliable observations, the set of actions, A, is augmented with a set of "discard" and "explain" actions for each observation $o_i$ in the observation sequence, O, with a penalty for the discard action. The penalty is set by defining a high duration to the "discard action".

This penalty encourages the planner to explain as many observations as possible. The duration of the original action is also updated, by adding a constant duration to all actions. This is the penalty for any possibly missing observations. To ensure that at least one of the given goals $G \subseteq \Gamma$ is achieved, and allow the use of a diverse planner that finds a set of plans, a special predicate "done" in addition to the corresponding predicate for the final fluent in the observation sequence are added to the goal of this transformed planning problem. In addition, an action is added for each goal $G \subseteq \Gamma$ with precondition g, and effect "done" to the set of actions.

Figure 6:
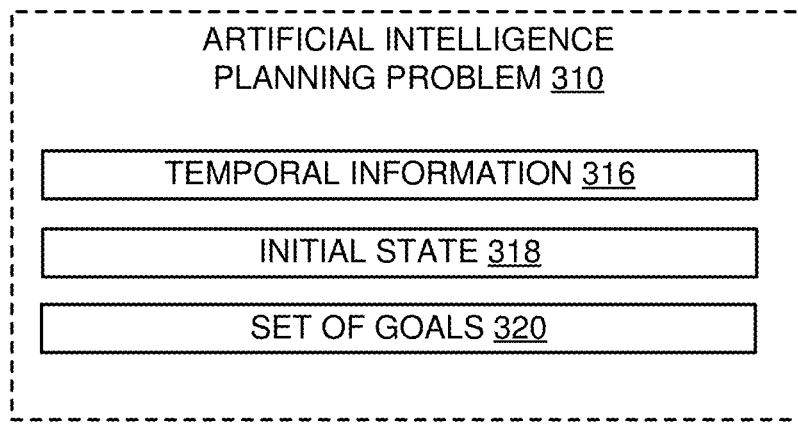
FIG. 6 illustrates a block diagram of a non-limiting example of an artificial intelligence planning problem in accordance with certain embodiments of the disclosed subject matter.

Thus, the simplified input 306 is transformed into the artificial intelligence planning problem 310. For example, and as illustrated in FIG. 6, the artificial intelligence planning problem 310 can include the temporal information 316, the initial state 318, and the set of goals 320. Repetitive description of like elements employed in other embodiments described herein is omitted for sake of brevity.

Figure 7:
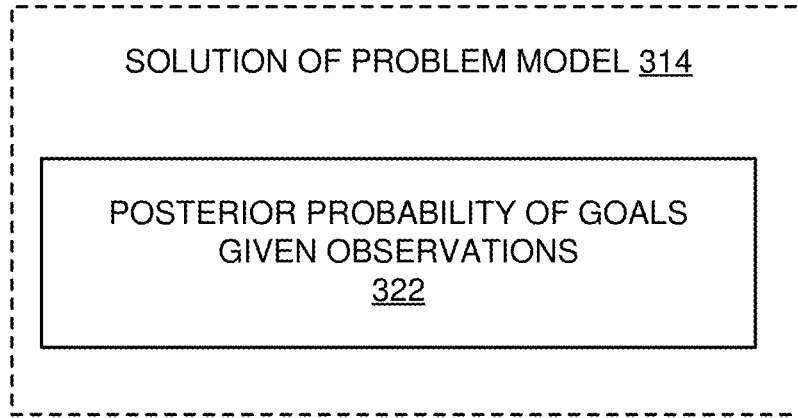
FIG. 7 illustrates a block diagram of a non-limiting example of a solution of a problem model in accordance with certain embodiments of the disclosed subject matter.

Referring again to FIG. 3, upon transformation into the artificial intelligence planning problem 310, an inference via temporal planning component 312 can compute at least one solution of the problem model 314. For example, as illustrated in FIG. 7, the solution of the problem model 314 can include a posterior probability of goals given observations 322. Repetitive description of like elements employed in other embodiments described herein is omitted for sake of brevity.

Generally, the computation of the inference via temporal planning component 312 can operate in three separate approaches to create the solution of the problem model 314. The three separate approaches include a delta approach, a diverse approach, and a hybrid approach which may or may not include a top-k planning component. Accordingly, when compiling by the planning projector component 106 and/or the inference via temporal planning component 312, the creation of the solution of the problem model 314 cannot be performed by a human (e.g., is greater than the capability of a single human mind). For example, an amount of data processed, a speed of processing of data and/or data types processed by the planning projector component 106 over a certain period of time can be greater, faster and different than an amount, speed and data type that can be processed by a single human mind over the same period of time. These computations are described below with reference to the three separate approaches.

As used herein, the term "delta" used in conjunction with embodiments describes an approach that can assign probabilities based on computing a cost difference, or the delta, the difference between the cost of the optimal plan that achieves the goal and the observations, and the cost of the optima plan that achieves the goal but not the observations. The delta approach computes the posterior probability of a goal given the observations, P (G|O) by running an artificial intelligence planner twice for each goal, once with the observations, and once without. More formally, P (G|O) is computed using Bayes Rules as set forth in Equation 3:

$$P(G|O) = \alpha P(O|G)P(G) \quad \text{Equation 3}$$

According to Equation 3, $\alpha$ is a normalization constant and P (G) is PROB or the goal priors. The cost difference, or $\Delta$, is defined as the difference in the cost of the optimal plan that achieves G and O, and the cost of the optimal plan that archives G but not O.

P (O|G) is defined as set forth in Equation 4:

$$P(O|G) \approx \frac{e^{\beta \Delta}}{1 + e^{-\beta \Delta}} \quad \text{Equation 4}$$

According to Equation 4, $\beta$ is a positive constant. The diverse approach assumes that the agent pursing goal G is more likely to follow cheaper plans. It also assumes that the probability that the agent is pursing a plan for goal G is dominated by the probability that the agent is pursing one of the most likely plans for goal G. Therefore, this approach only computes one plan (i.e., the optimal plan) for each setting of the problem model 102. Further, this approach does not address discarding the unexplainable observations explicitly.

As used herein, the term "diverse" used in conjunction with embodiments describes an approach that can assign probabilities by using diverse planners. The diverse approach computes both the posterior probability of the plans as well as goals by running a diverse temporal planner on the transformed temporal planning problem. It then uses the following formulas to approximate the probabilities. In particular, it first computes P ($\pi$|O) as defined in Equation 5:

$$P(\pi|O) = \beta P(O|\pi)P(\pi) = (O|\pi)P(\pi|G)P(G) \quad \text{Equation 5}$$

According to Equation 5, $\beta$ is a normalizing constant that depends on P (O) only. Furthermore, P (O|$\pi$)·P ($\pi$|G) is approximated as set forth in Equation 6:

$$P(O|\pi) \cdot P(\pi|G) \approx 1 - \frac{\beta' V(\pi)}{\Sigma_{\pi' \in \Pi} V(\pi')} \quad \text{Equation 6}$$

According to Equation 6, $\beta$ is a positive constant used to offset large sums. Furthermore, $\Pi$ is a sampled set of plans that satisfy the observations and achieve at least one of the goals G$\subseteq\Gamma$. Additionally, V ($\pi$)=$b_1 \cdot d$ ($\pi$)+$b_2 \cdot N$ and is the value of the weighted factor over two objectives for the plan it that achieves goal G and satisfies the observation O: (i) the original duration of the actions in the domain, and (ii) the duration of the discard actions (i.e., unexplainable observations). Coefficients $b_1$ and $b_2$ are used to give weights to the importance of the original actions and the discard actions respectively. N is the number of unexplainable observations. The missing observations are not addressed separately, but rather handled implicitly by the coefficients $b_1$ and $b_2$ for the duration of the original actions. Following the transformation to a planning problem as described above, the value of V(R) is equivalent to duration of the plan $\pi$.

The posterior probabilities of goals given observations are then computed by a summation over all the values of P ($\pi$|O) for the sampled set of plans, $\Pi$, that achieve G and satisfy O as dictated by Equation 7:

$$P(G|O) = \sum_{\pi \in \Pi} P(\pi|O) \quad \text{Equation 7}$$

As relayed in Equation 7, the set of plans $\Pi$ is computed using diverse planning In diverse planning, the objective is to find a set of plans m that are at least d distance away from each other. The solution to a diverse planning problem, (m, d), is a set of plans $\Pi$ such that |$\Pi$|=m and $\min_{\pi, \pi' \in \Pi} \delta$ ($\pi$, $\pi'$)$\geq$d, where $\delta(\pi, \pi')$ measures the distance between plans. It is also possible to implement a top-k planner approach using the diverse approach, where a set of possibly diverse high-quality plans are found.

As used herein, the term "hybrid" used in conjunction with embodiments describes an approach that can assign probabilities using both diverse planning and the cost difference approach. Thus, the hybrid approach can be a combination of both the delta and the diverse planning approach. In the hybrid approach, the diverse temporal planner is again used as in the diverse approach, this time to compute a smaller set of plans for each of the different goals. After merging the sets of diverse plans, the posterior probabilities can be computed as in the diverse approach, given the merged set of diverse plans. The hybrid approach forces the diverse planner to compute a set of plans for each of the goals, rather than allowing it to choose the goal that is shortest to reach, as is done in the diverse approach. Thus, each of the possible goals is assigned at least one representative plan that is taken into account when computing the posterior probabilities of the different goals. In doing so, we every goal is covered and accounted for. It is noted that the hybrid approach, on average, achieves the highest coverage rates across all domains.

Turning back to FIG. 3, and as noted in the description above, the inference via temporal planning component 312 can operate according to a plurality of approaches. Thus, when organized according to the delta approach, the inference via temporal planning component 312 can be termed a delta planning component. Similarly, when organized according to the diverse approach, the inference via temporal planning component 312 can be termed a diverse planning component. Furthermore, when organized according to the hybrid approach not implementing a top-k planner, the inference via temporal planning component 312 can be termed a hybrid planning component. Moreover, when organized according to the hybrid approach and implementing a top-k planner, the inference via temporal planning component 312 can be termed a top-k planning component.

Hereinafter, experimental results are discussed with referenced to FIG. 8, that provide evaluation for each of the above artificial planning components. Each approach, including the delta, diverse, and hybrid approaches were evaluated. A diverse planner LPG-d was implemented for the diverse planning approach and the hybrid approach, and a temporal planner LPG-TD was implemented for the delta approach. These particular planners were chosen based on expectations to run successfully, using the transformed planning problem, based on the problem model 102, as input. It is noted that the results for the diverse approach were obtained by running the diverse planner LPG-d once for each problem model 102. For the hybrid approach, the diverse planner was run once for each goal, that is |G| times. For the delta approach, LPG-TD was run 2×|G| times. A timeout of 30 minutes was implemented for all experimental data on a dual 16-core 2.70 GHz INTEL(R) XEON(R) E5-2680 processor with 256 GB RAM. For the LPG-D planner two settings of (m, d), (10, 0.2), (50, 0.2) were implemented. For the coefficients, $b_1$ was set to be the maximum of all action durations in the domain. Coefficient $b_2$ was set to be ten times $b_1$. Thus, a higher penalty was assigned for the unexplained or unreliable observations, and a lower penalty was assigned for the missing observations.

A combination of elements was addressed in this disclosure that has not been addressed by previous research. Thus, for evaluation purposes, a set of novel benchmarks was created based on the International Planning Competition (IPC) domains and the Competition of Distributed and Multiagent Planners (CoDMAP). Namely Rovers (a domain where a collection of rovers navigate a planet surface, finding samples and communicating them back to a lander), Depots (a domain in which trucks can transport crates around and then the crates must be stacked onto pallets at their destinations), Satellites (a domain which requires planning and scheduling a collection of observation tasks between multiple satellites, each equipped in slightly different ways), and ZenoTravel (a domain which requires the transportation of people around in airplanes, using different modes of movement). The original domains are either temporal or are multi-agent and are not plan recognition problems. The domains were modified to create benchmark problems for the multi-agent plan recognition problem with temporal actions. In combining the multi-agent and temporal aspect of the problems, a number of issues were addressed that overlooked concurrency. For example, in the Rovers domain, two rovers are able to sample the same rock sample at the same time, and when one of the rovers is done sampling, the other can still work on the same sample, although it is depleted. In the Depots domain, the effect of a "lift" action, executed on a crate, is that the hoist is now lifting the crate. The effect should only be applied at the end of the action's execution time, yet in the original domain it is immediately applied at the start. Therefore the modified version of the domains was implemented, where these issues were addressed.

To construct the plan recognition problems, a number of plans were computed that are a solution to the original planning problems. From these plans, actions were sampled in order to construct O, the at least partially ordered sequence of observations 104, while keeping track of the goal used in the original planning problem (i.e., ground truth goal). To evaluate how well the approaches address missing observations, several problems were created for testing that did not have the full observation sequence (i.e., some observations are missing observations). This was accomplished by randomly selecting 10%, 40%, 70% and 100% of the observations in O. Therefore, the 100% case indicates that the full observation sequence, O, is given. Furthermore, to evaluate how these approaches address noise, extra observations were randomly, which were not observed, to the original observation sequence.

Figure 8:
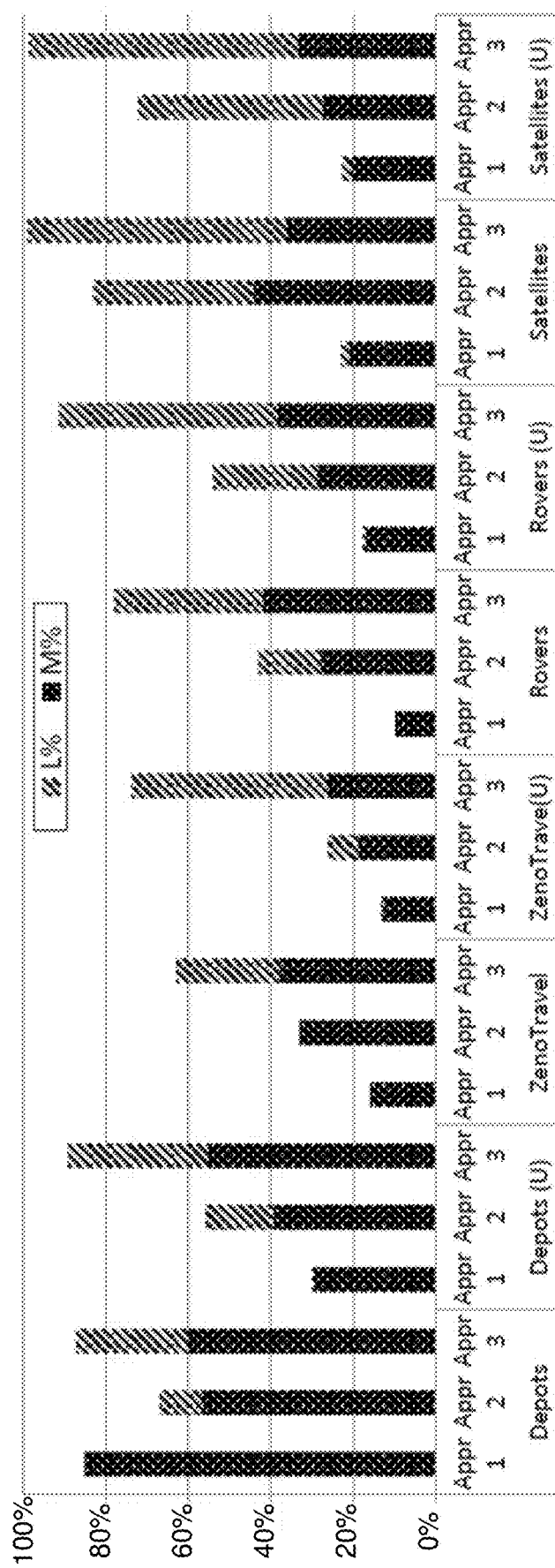
FIG. 8 illustrates a graph of experimental results based on one possible implementation of certain embodiments of the disclosed subject matter.

FIG. 8 presented the summary of the results when evaluating the three main plan recognition approaches for recognizing a goal. Approach 1 is the delta approach, Approach 2 is the diverse approach and Approach 3 is the hybrid approach, all described in detail above.

For each setting of the problem, two ground truth plans were generated, and having 20 problems in each domain. The problems varied in difficulty (i.e., number of objects, agents etc.), thus the more difficult problems were computationally more complex. In addition, a number of extra observations (i.e., noise) were added during experimentation. There were two levels of noise, one of which adds 12% extra, possibly unexplainable observations relative to the number of original observations, while the other added the same percentage of extra observations, only relative to the size of the ground truth plan. Thus, the level of noise is better adapted to a specific problem. FIG. 8 presents the results for each of the four domains, with and without the introduction of unreliable observations. In FIG. 8, (U) signifies that the results are an average over all cases where unreliable observations were introduced in a specific domain, and of all 20 problems in the domain.

To evaluate the coverage and accuracy of the different approaches, the approximation of the posterior probability of a goal was computed given the observations, P (G|O) (not shown in FIG. 8), in addition to the average percentage of instances in which the ground truth goal was deemed most likely and less likely (i.e., whether or not the ground truth goal was assigned the highest probability). These values, M and L, are shown respectively in the dotted and dashed portions of the bars in FIG. 8. The overall value of M and L, sum of the most and less likely percentages, indicates the goal recognition coverage for that method, and is expressed by the total height of each bar. The most likely goals are chosen relative to that particular approach (i.e., goals with the highest posterior probability) and the less likely goals are those goals with greater than 0.03 posterior probability.

The results in FIG. 8 show that Approach 1 does best (i.e., highest M value on average) in the Depots domain when observations are reliable or no noise is introduced, yet it is very sensitive to noise and does much worse than the other approaches when observations are unreliable (i.e., missing or unexplainable). Approach 1, on average, also performs best with regard to the approximation of the posterior probability of the ground truth goal given the observations, P (G|O), in the Depots domain. However, as with the M value, Approach 1 is highly sensitive to noise. Overall, when noise was introduced, Approach 3 performs best with regard to P (G|O). In addition, the results show that on average, Approach 3 achieves the best coverage (i.e., the total height of the bars) across all domains. Furthermore, the results show that on average, Approach 3 achieves the best precision in detecting the ground truth goal when unexplainable observations are added, as indicated by the height of the dotted portions of the bars where (U) is present. On average, over all problem models tested, when unreliable observations were not introduced, Approach 1 had 34% coverage, Approach 2 had 56% coverage, and Approach 3 had 82% coverage. When unreliable observations were introduced, Approach 1 had 21% coverage, Approach 2 had 52% coverage, and Approach 3 had 88% coverage.

It is noted that while one would expect to see the best results in cases where unreliable observations are not introduced (i.e., sections in the figure where (U) is absent), this is not the case in general. This can be attributed to the fact that the ground truth plans from which the observations are sampled, are sub-optimal, which makes the task of recognizing the ground truth goal more challenging. For example, the system 100 might attempt to explain an observation o that has been sampled from a sub-optimal plan that achieves goal G; observation o correlates to a part of the plan, which causes the overall duration to be higher (e.g., an unnecessary detour). In this example, the system 100 will deem it less likely that the agent is pursuing goal G given observation o, due to the duration-sensitive nature of all computational approaches presented. It is also noted that in some implementations tested, the sheer amount of observations caused some problem instances to become computationally challenging, and often led to the system timing out. Time outs can explain why the results are, in some cases, worse when less unreliable observations are introduced. Additionally, since the extra observations are added randomly, in some cases the observations are unexplainable, while in other cases it is possible for the system to explain the extra observations by computing very long and costly plans. This, combined with the fact that the ground truth plans are sub-optimal, can account for some of the unexpected results, for example in cases where introduced noise does not hurt performance. The nature of the do-mains (e.g., interchangeable objects or inconsequential order of action execution) causes some of them to be less sensitive to this issue than others.

As described above, an artificial intelligence driven solution to a multi-agent plan recognition problem has been provided through the various embodiments described herein. Embodiments described in this disclosure can include, for example, a computer-implemented method and a planning projector component that can provide the described solution. The computer-implemented method can comprise transforming a multi-agent plan recognition problem model and an at least partially ordered sequence of observations into an artificial intelligence planning problem through a transform algorithm. The computer-implemented method can further comprise computing a plan using an artificial intelligence planner on the artificial intelligence planning problem and translating the computed plan into a solution of the multi-agent plan recognition problem model.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
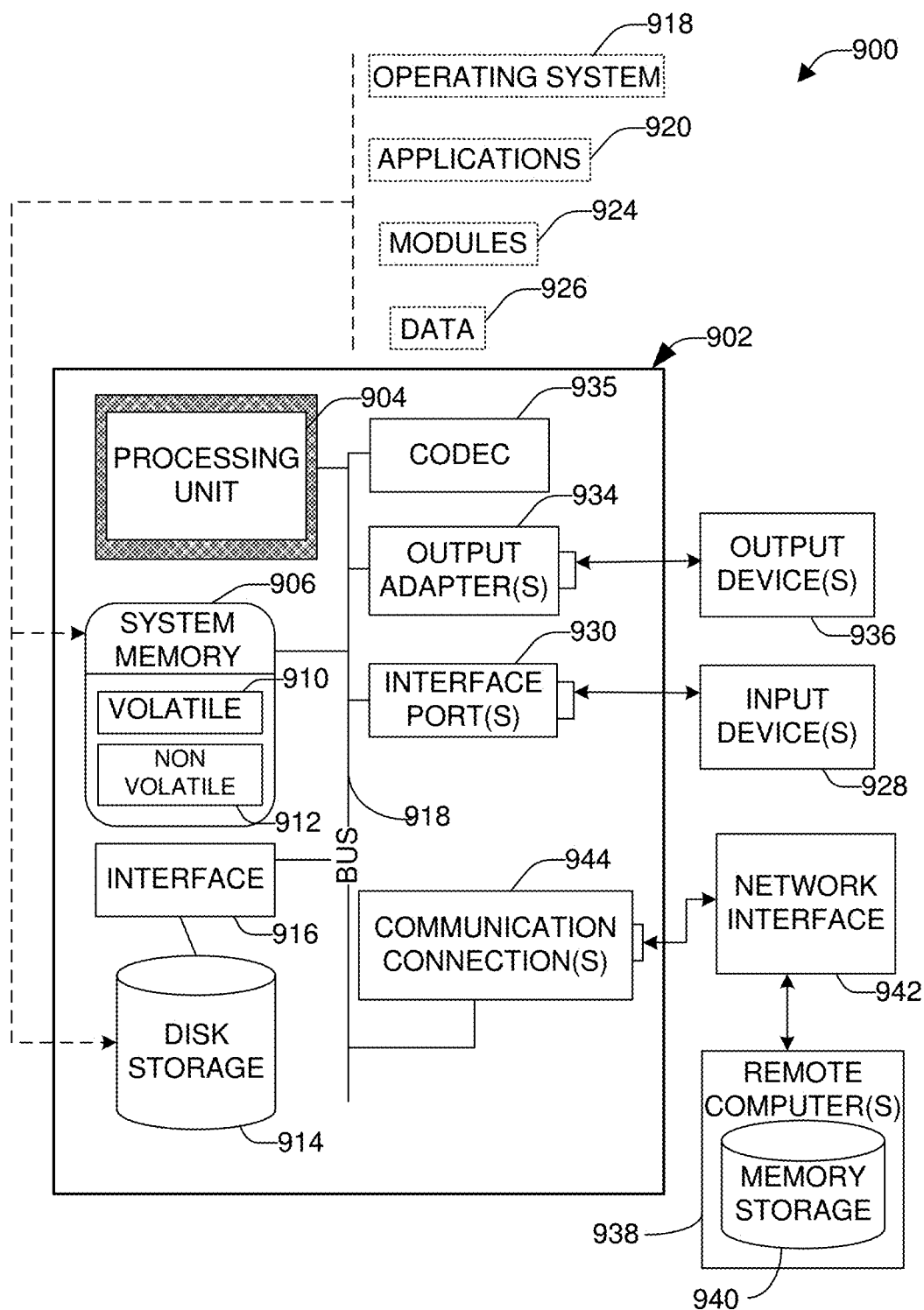
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include removable/non-removable, volatile/non-volatile computer storage medium. FIG. 9 illustrates, for example, disk storage 914. Disk storage 914 includes, but is not limited to, devices like a magnetic disk drive, solid state disk (SSD), flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 or transmitted to the server or application. The user can be provided the opportunity to opt-in or opt-out of having such information collected or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/ software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    transforming, by a device operatively coupled to a processor, a problem model and an at least partially ordered sequence of observations into an artificial intelligence planning problem through a transform algorithm, wherein the problem model comprises a domain description from a plurality of agents and a durative action, wherein at least one of the observations of the at least partially ordered sequence of observations is a condition that changes over time, and wherein the plurality of agents comprises an agent operated in accordance with a plan;
    determining, by the device, plan information corresponding to the plan using an artificial intelligence planner on the artificial intelligence planning problem, wherein the plan information is determined by the artificial intelligence planner by determining a posterior probability of the agent operated in accordance with the plan, wherein the artificial intelligence planner determines the posterior probability two times per goal, wherein the determining the posterior probability employs an approach that comprises assigning a cost difference between a first cost of an optimal plan to achieve a goal comprising one or more observations and a second cost of the optimal plan to achieve the goal prior to the one or more observations, and wherein a combined difference between the first cost of the optimal plan and the second cost of the optimal plan determines the posterior probability, based on the at least partially ordered sequence of the one or more observations of one or more prior occurrences; and
    translating, by the device, the plan information into information indicative of a solution to the artificial intelligence planning problem.

2. The computer-implemented method of claim 1, wherein the partially ordered sequence of observations comprises an action condition, and wherein the computer-implemented method further comprises:
translating, by the device, the action condition into a second condition that changes over time.

3. The computer-implemented method of claim 1, wherein a description of the problem model comprises an attribute selected from the group consisting of one or more facts, an initial state, one or more action operators, a goal condition, and a number of agents of the plurality of agents in the problem model.

4. The computer-implemented method of claim 1, wherein a description of the problem model comprises a defined initial state or a defined goal condition.

5. The computer-implemented method of claim 1, wherein the determining the plan information comprises determining the plan information employing a top-K planning component.

6. The computer-implemented method of claim 1, wherein the determining the plan information comprises determining the plan information employing a diverse planning component.

7. The computer-implemented method of claim 1, wherein the determining the plan information comprises determining the plan information employing a delta planning component.

8. The computer-implemented method of claim 1, wherein the determining the plan information comprises determining the plan information employing a hybrid planning component.

9. The computer-implemented method of claim 1, wherein the at least partially ordered sequence of observations comprises an unreliable observation, and wherein the unreliable observation is an observation selected from the group consisting of an inconsistent observation, a noisy observation, and a missing observation.

10. The computer-implemented method of claim 1, wherein the transforming comprises maintaining, in the artificial intelligence planning problem, one or more prior access restrictions of the plurality of agents relative to one another.

11. The computer-implemented method of claim 1, wherein the agent operated in accordance with the plan is an agent operated in accordance with the plan to achieve the goal, and wherein the computer-implemented method further comprises:
determining, by the device, goal information corresponding to the goal using the artificial intelligence planner on the artificial intelligence planning problem, by determining a posterior probability of the agent operated to achieve the goal, based on the at least partially ordered sequence of observations.

12. The computer-implemented method of claim 1, wherein the transforming comprises preserving, by the device, the at least partially ordered sequence of the observations in the artificial intelligence planning problem.

13. The computer-implemented method of claim 1, wherein the determining comprises applying, by the device, a penalty relative to discarding by the artificial intelligence planner of an observation of the at least partially ordered sequence of the observations.

14. A computer program product facilitating a process to infer a solution to a multi-agent problem model, the computer program product comprising a computer readable storage medium having program instructions embodied therewith, the program instructions executable by a processor to cause the processor to:
transform, by the processor, a problem model and an at least partially ordered sequence of observations into an artificial intelligence planning problem through a transform algorithm, wherein the problem model comprises a domain description from a plurality of agents and a durative action, wherein at least one of the observations of the at least partially ordered sequence of observations is a condition that changes over time, and wherein the plurality of agents comprises an agent operated in accordance with a plan;
determine, by the processor, plan information corresponding to the plan using an artificial intelligence planner on the artificial intelligence planning problem, wherein the plan information is determined by the artificial intelligence planner by determining a posterior probability of the agent operated in accordance with the plan, wherein the artificial intelligence planner determines the posterior probability two times per goal, wherein the determining the posterior probability employs an approach that comprises assigning a cost difference between a first cost of an optimal plan to achieve a goal comprising one or more observations and a second cost of the optimal plan to achieve the goal prior to the one or more observations, and wherein a combined difference between the first cost of the optimal plan and the second cost of the optimal plan determines the posterior probability, based on the at least partially ordered sequence of the one or more observations of one or more prior occurrences; and
translate, by the processor, the plan information into information indicative of a solution to the artificial intelligence planning problem.

15. The computer program product of claim 14, wherein the program instructions are further executable by the processor to cause the processor to:
maintain, by the processor, in the artificial intelligence planning problem relative to the transforming, one or more prior access restrictions of the plurality of agents relative to one another.

16. The computer program product of claim 14, wherein the agent operated in accordance with the plan is an agent operated in accordance with the plan to achieve a goal, and wherein the program instructions are further executable by the processor to cause the processor to:
determining, by the processor, goal information corresponding to the goal using the artificial intelligence planner on the artificial intelligence planning problem, including determining, by the processor, a posterior probability of the agent operated to achieve the goal, based on the at least partially ordered sequence of observations.

17. The computer program product of claim 14, wherein the program instructions are further executable by the processor to cause the processor to:
preserve, by the processor, relative to the transforming, the at least partially ordered sequence of the observations in the artificial intelligence planning problem.

18. The computer program product of claim 14, wherein the program instructions are further executable by the processor to cause the processor to:
apply, by the processor, relative to the determining, a penalty relative to discarding by the artificial intelligence planner of an observation of the at least partially ordered sequence of the observations.

19. The computer program product of claim 14, wherein the partially ordered sequence of observations comprises an action condition, and wherein the program instructions are further executable by the processor to cause the processor to:

translate, by the processor, the action condition into a second condition that changes over time.

20. The computer program product of claim 14, wherein the at least partially ordered sequence of observations comprises an unreliable observation, and wherein the unreliable observation is an observation selected from the group consisting of an inconsistent observation, a noisy observation, and a missing observation.

\* \* \* \* \*